US007243827B2

(12) United States Patent
Lehrieder

(10) Patent No.: US 7,243,827 B2
(45) Date of Patent: Jul. 17, 2007

(54) DEVICES FOR DRAWING IN A WEB OF MATERIAL

(75) Inventor: Erwin Paul Josef Lehrieder, Gaukönigshofen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 10/476,178

(22) PCT Filed: May 2, 2002

(86) PCT No.: PCT/DE02/01590

§ 371 (c)(1),
(2), (4) Date: Nov. 5, 2003

(87) PCT Pub. No.: WO02/090650

PCT Pub. Date: Nov. 14, 2002

(65) Prior Publication Data

US 2004/0104256 A1 Jun. 3, 2004

(30) Foreign Application Priority Data

May 5, 2001 (DE) ................................ 101 21 945

(51) Int. Cl.
*G03B 1/56* (2006.01)

(52) U.S. Cl. ...................................... 226/92; 242/562.1

(58) Field of Classification Search .................. 226/91, 226/92, 95, 172; 242/562.1
See application file for complete search history.

(56) References Cited

U.S. PATENT DOCUMENTS

| | | | | |
|---|---|---|---|---|
| 4,111,122 | A * | 9/1978 | Kutzner et al. | 101/228 |
| 4,387,861 | A * | 6/1983 | Kampf | 242/412.1 |
| 4,828,201 | A * | 5/1989 | Smith | 242/332.4 |
| 5,052,295 | A | 10/1991 | Suzuki et al. | |
| 5,062,923 | A | 11/1991 | Morgan | |
| 5,397,044 | A | 3/1995 | Suzuki | |
| 6,106,177 | A * | 8/2000 | Siegl et al. | 400/618 |
| 6,193,845 | B1 * | 2/2001 | Graf et al. | 162/193 |
| 6,268,005 | B1 * | 7/2001 | Brewer | 426/502 |
| 6,408,748 | B1 | 6/2002 | Hajek et al. | |
| 6,425,513 | B1 | 7/2002 | Madrzak et al. | |
| 6,810,812 | B2 * | 11/2004 | Fischer | 101/485 |

FOREIGN PATENT DOCUMENTS

| | | | |
|---|---|---|---|
| DE | 2 241 127 | | 3/1974 |
| DE | 40 29 927 | A1 | 5/1991 |
| DE | 94 09 390.3 | U1 | 10/1994 |
| DE | 94 15 859.2 | U1 | 1/1995 |

(Continued)

*Primary Examiner*—Gene O. Crawford
*Assistant Examiner*—Evan H. Langdon
(74) *Attorney, Agent, or Firm*—Jones, Tullar & Cooper, PC

(57) ABSTRACT

A device for drawing a web of material into a machine, such as a printing press includes a draw-in mechanism that can be advanced along a draw-in path, and to which the web of material can be coupled. The draw-in mechanism can be driven by an electric motor that can be regulated or controlled in response to measurement data which is determined during the draw-in process. The motor can be regulated or controlled in synchronism with another unit of the machine, which other unit is mechanically driven independently of the electric motor.

8 Claims, 1 Drawing Sheet

FOREIGN PATENT DOCUMENTS

| | | | |
|---|---|---|---|
| DE | 197 24 123 | A1 | 12/1998 |
| EP | 0 332 352 | A2 | 9/1989 |
| EP | 0 418 903 | A2 | 3/1991 |
| EP | 0 699 524 | A2 | 3/1996 |
| GB | 2 236 983 | | 4/1991 |

* cited by examiner

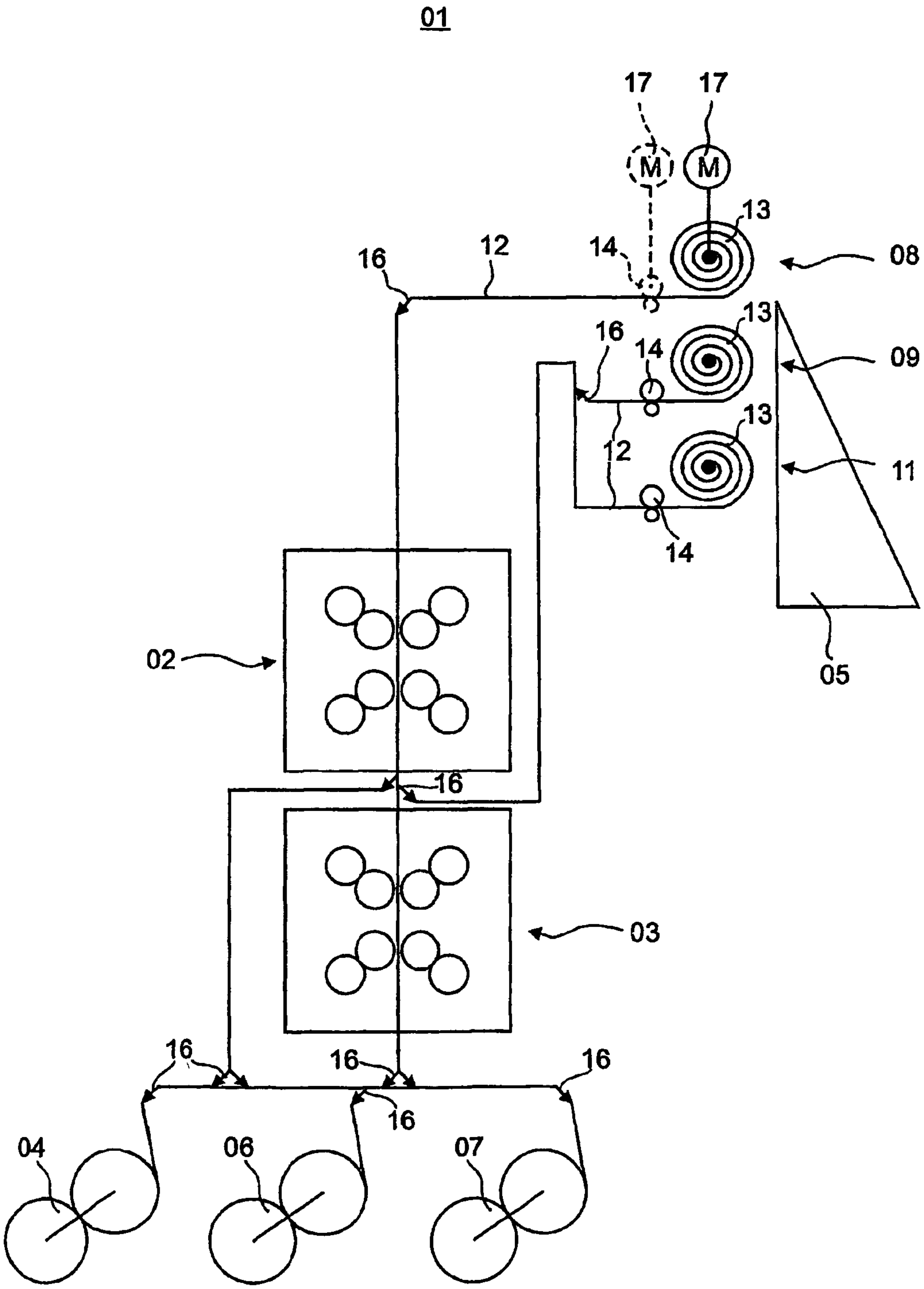
01
17
17
M
M
13
08
12
14
16
13
16
14
09
13
12
11
14
02
05
16
03
16
16
16
16
16
04
06
07

DEVICES FOR DRAWING IN A WEB OF MATERIAL

FIELD OF THE INVENTION

The present invention is directed to devices for drawing a web of material into a processing machine. The device includes a web draw-in mechanism which is driven, independently of the processing machine, by an electric motor.

BACKGROUND OF THE INVENTION

Web drawing devices are employed in printing presses for conveying the start of a web of material along a desired draw-in path through the printing press. This is required, for example, for a draw-in in connection with a new production. This is also always required in the case where a web of material was torn during the printing process, because then the start of the new web of material cannot be pulled through in the manner of a flying roll change. Furthermore, in modern printing presses the printing groups can be reached by the web to be printed along different conveying paths in order to be able to obtain correspondingly different printing results. In case of a change-over in the conveying path, the fresh web of material must be drawn in along the appropriate draw-in path.

A device for drawing a web of material into a processing station is known from DE 94 15 859 U1. The draw-in mechanism, which is in the shape of a tape, can be rewound from a winding roll at the inlet of the processing station to a winding roll at the outlet of the processing station.

A device for drawing webs of material into rotary printing presses is known from DE 22 41 127 A1. The draw-in mechanism, which is embodied in the form of a spring steel strip, can be pushed from the outlet of the printing press along different draw-in paths, between which switching can be performed by the use of shunts. In this case, the draw-in mechanism is driven by a stationarily arranged drive wheel, which drive wheel comes into positive contact with the draw-in mechanism and pushes the draw-in mechanism along its entire length through the printing press.

EP 0 418 903 A2 discloses a device for drawing in a web of material. A draw-in mechanism is driven by a motor which is controlled as a function of measured data obtained in the draw-in process. Control is performed with a view to a constant draw-in speed, or to a constant number of revolutions.

A device for drawing in a web of material is disclosed in DE 94 09 390 U1. A draw-in mechanism is driven by a step motor. A conveying distance already traveled by the draw-in mechanism is detected by sensors.

SUMMARY OF THE INVENTION

The object of the present invention is directed to providing devices for drawing in a web of material.

In accordance with the present invention, this object is attained by the provision of a draw-in mechanism that is usable to draw a web along a draw-in path in a web processing machine. The web draw-in mechanism is driven by an electric motor which is driven independently of at least one other unit of the web processing machine. The electric motor and a drive mechanism for the at least one other unit are regulated, or controlled in relation to each other. The electric motor driving the draw-in mechanism can be regulated with respect to a pre-set moment at the electric motor. The electric motor can also be regulated as a function of a conveying speed of the draw-in mechanism.

A particular advantage of the present invention lies in that the flexibly and finitely embodied draw-in mechanism can be wound onto a reel body, so that only very little space is required for storing the portion of the draw-in mechanism which is not pushed into the printing press.

The embodiment of the draw-in mechanism as a finite draw-in mechanism, which can be fastened with one end on a reel body and which can be completely wound on the reel body, has a great advantage. In contrast to endless or re-windable draw-in mechanisms, it is possible, in accordance with the present invention, to realize different draw-in paths via shunts.

Basically, the driving of the draw-in mechanism can be assured in any arbitrary manner. In accordance with a preferred embodiment of the present invention, the draw-in mechanism is driven by the driven reel body, which can be driven in two directions of rotation for winding, or for unwinding, the draw-in mechanism. Thus, a separate drive wheel for driving the draw-in mechanism can be omitted.

Preferably, a controllable electric motor is employed for driving the reel body. The reel body can thus be driven in a controlled manner at different rotational speeds and/or torques. A constant conveying speed, or a comparable moment, can be set at the draw-in mechanism by an appropriate measurement, for example of the feeding speed of the draw-in mechanism, or of the applied moment. However, in a different embodiment, the electric motor can also be correspondingly controlled with respect to a speed, for example frequency or a torque output.

A multitude of sensors are usable for measuring the conveying speed of the draw-in mechanism. A particularly simple construction results if the effective circumference of the reel body, by use of which the draw-in mechanism is unwound, and the rotational speed of the reel body are measured, or are preset in the form of a graph. The effective circumference of the reel body is understood to be the value resulting from the circumference of the reel body itself and the circumference of the layers of the draw-in mechanism which are still wound on the reel body. By evaluating these two measured values, it is possible, in a simple manner, to determine the linearly directed feeding speed of the draw-in mechanism and thereafter to set that feeding speed to a command value by an appropriate regulation of the rotational speed of the reel body. Also, a corresponding dependence of the command value rpm from the number of revolutions performed, stored in the form of a control curve in the software, is conceivable.

It is necessary, in the course of pushing the draw-in mechanism through the printing press, to transmit considerable compressive forces in order to overcome the frictional forces existing in the guide devices. Therefore, the draw-in mechanism can be preferably embodied in the form of a steel tape, and in particular in the form of a spring steel tape, since steel tapes have great flexibility and at the same time can transmit large tensile or compressive strains. However, the use of also known plastic tapes, chains or correspondingly embodied cables is, of course, also possible.

In order to reduce, as much as possible, the frictional forces occurring at the draw-in mechanism, which frictional forces must be overcome by the drive mechanism, the draw-in mechanism can be sheathed, at least in part, in a friction-reducing layer. For example, it is possible to sheathe the draw-in mechanism, which is in the form of a steel tape, in a layer of plastic in order to combine, in this way, the material properties of the steel tape of high tensile or compressive resistance with the desired low-friction material properties of the plastic.

BRIEF DESCRIPTION OF THE DRAWING

A preferred embodiment of the devices for drawing in a web of material, in accordance with the present invention is represented in the sole drawing FIGURE and will be described in greater detail in what follows. The sole drawing FIGURE shows a printing press with a device for drawing-in a web of material in a schematically represented side elevation view.

DESCRIPTION OF THE PREFERRED EMBODIMENT

A draw-in device 08, 09, 11, for use in the drawing in a start of a web of material is provided in a processing machine 01. The processing machine 01 may be, for example a printing press 01, for use in processing webs of material, for example paper webs.

The printing press 01, which is schematically represented in side elevation in the sole drawing, has two printing units 02, 03, each with two double printing groups, or four printing groups. The printing press 01 also has three roll changers 04, 06, 07.

The three devices 08, 09, 11 for drawing a web of material into the printing press 01 are arranged downstream of the outlet of the printing units 02, 03. Each of the web draw-in devices 08, 09, 11 consists of a draw-in mechanism 12 embodied in the form of a spring steel tape 22, which can be wound on a reel body 13, which is embodied in a rotationally symmetrical manner.

In a first preferred embodiment, the reel body 13 is driven by the use of a motor 17, for example an electric motor 17, which motor 17 is only represented in connection with the upper reel body 13, and in particular reel body 13 is driven by the use of a controllable a.c. motor 17 with a frequency converter. Control is performed in such a way that, with a changing effective reel radius, the number of revolutions of the reel is changed in such a way that an almost chronologically constant draw-in speed of the draw-in mechanisms 12, such as the spring steel tape 22 is provided.

In another mode of operation, regulation of the electric motor 17 can also take place in such a way that the electric motor 17 is operated at any time with a defined presettable moment and, in this way, results in a largely constant web draw-in force. This moment can be constant, for example for short draw-in distances, and for longer draw-in paths it can take place, for example, along a predeterminable curve.

In a general way, the electric motor 17 can be controlled as a function of measured data obtained in the course of the draw-in, which measured data provide information regarding the progress and/or existing moments.

In a second preferred embodiment, which is represented by dashed lines in the sole drawing, the draw-in mechanism 12 can be driven by the use of a synchronous drive mechanism 14 that is constituted by two rollers enclosing the draw-in mechanism 12. The synchronous drive mechanism 14 can also have a driven roller and an undriven roller, which driven roller can be placed against the undriven roller. The reel body also has a motor which, in this second embodiment, need not be controllable in the way of the electric motor 17 discussed in connection with the first embodiment.

In this second preferred embodiment, the electric motor 17, which is shown in dashed lines is arranged driving the synchronous drive mechanism 14, also shown in dashed lines, and is controlled, in the same fashion as discussed above, to provide a constant draw-in speed or a constant, or presettable moment.

In both examples, the reel body 13 has a center shaft on which the one end of the draw-in mechanism 12 is fixed. Moreover, lateral flanges or cheeks are provided at the ends of the center shaft against which the portion of the draw-in means 12 wound on the reel body 13 is laterally supported.

It is also possible, in accordance with the present invention, to arrange only a single draw-in device 08, 09, 11 downstream of the outlet of the printing units 02, 03. A selection of the draw-in path can be realized by the arrangement of shunts 16, which are not represented in detail in the sole drawing FIGURE.

By driving the reel body 13 in a clockwise direction, as seen in the sole drawing, the finite draw-in mechanism 12 can be wound off the reel body 13 and pushed, depending on the position of the shunts 16, which are only schematically represented, along selected ones of different draw-in paths that extend through the printing press 01. In the process, the draw-in mechanism 12 is guided by guide rails, which are not specifically represented. In the area of the inlet to the printing press 01, the draw-in mechanism 12 can be connected with the start of the respective paper web at one of the roll changers 04, 06 or 07, so that the paper web is conveyed through the printing press 01 by retracting the draw-in mechanism 12 along a desired draw-in path.

The control of the electric motor 17 driving the reel body 13 in accordance with the first preferred embodiment, can also be applied in connection with draw-in devices wherein a finite length draw-in mechanism 12 is rewound from a reel body, not represented, in the area of the roll changers 04, 06, 07 to a reel body 13 located downstream of the outlet of the printing units 02, 03, and vice versa.

In an advantageous embodiment of the present invention, the individual components of the printing units 02, 03, for example the cylinders of the printing groups individually or in pairs, the entire printing group of the printing unit, the driven rollers of the paper guide device, the folding apparatus, and possibly additional rotatable elements of the printing press, each can have their own drive motor. Matching, or synchronization of these units, takes place by use of a so-called “virtual guide axis” or “electronic shaft”, which electrically connects the regulating or control devices of the units with each other. A regulating device, or a control device of the electric motor for the synchronous drive mechanism 14 or for the direct drive of the reel body 13 is electrically connected with this “virtual guide axis”. A speed of the draw-in mechanism 12 approximately corresponds to the respective surface speed of the units in contact with the web, for example the respective cylinders of the printing units 02, 03, the driven paper guide or draw-in rollers, not represented, the roll changers 04, 06, 07, and the like.

The respective number of revolutions, or the angular speed of the electric motor 17 for the synchronous drive mechanism 14, or for the reel body 13, is determined in an electronic circuit or in a computer unit, possibly by using a controllable frequency converter, which is present at the electric motor 17. In a reverse manner, it is also possible to preset a possibly constant draw-in speed, wherein the remaining units relating to the draw-in process are driven with a corresponding circumferential speed via the electronic shaft. In the case of the direct drive of the reel body 13, the change of the effective diameter must be superimposed on the desired or required draw-in speed in the described way.

The preferred embodiment for regulating the electric motor 17, in respect to a moment, is directed to a limitation of the stress on the web, or on the connection between the web and the draw-in mechanism 12 during the draw-in process. In the case of a directly driven reel body 13, this regulation is performed, as already partially explained above, by taking into consideration the changing diameter of the web draw-in mechanism 12 situated on reel body 13. This consideration is taken, for example, in an electronic circuit or in a computer unit by the use of stored functions, for example, as a function of the revolutions performed, or of angles, or by means of the above mentioned measured values. In addition, it is possible, by use of information regarding the already taken and/or the remaining draw-in path determined by measurements or in another way, for example by the revolutions made, or the angles to provide a superimposition of a moment required for overcoming the friction.

The angular speed, or the number of revolutions, can be detected at the reel body or at the electric motor 17, for example by the use of incremental encoders and, as in the previously mentioned example, this angular speed can be preset following an appropriate re-calculation via the electronic shaft to the control or regulating devices of other, individually driven units. However, the determination of the draw-in speed can also be performed in other ways on the draw-in path.

While preferred embodiments of a device for drawing in a web of material in accordance with the present invention have been set forth fully and completely hereinabove, it will be apparent to one of skill in the art that various changes in the number and configuration of the printing units, the number and configuration of the roll changers, and the like could be made without departing from the true spirit and scope of the present invention which is accordingly to be limited only by the following claims.

What is claimed is:

1. A device for drawing a web of material into a processing machine comprising:

a flexible draw-in mechanism including a tape having a finite length, said tape having a tape first end and a tape second end, said draw-in mechanism being adapted to be driven for movement of said tape second end along a draw-in path;

a reel body, said tape first end being connected to said reel body, said tape having said finite length being windable completely on said reel body;

an effective reel body radius, said effective reel body radius being changeable as a function of an amount of said tape finite length wound on said reel body; and a controllable electric motor usable to drive said reel body independently of the processing machine to cause said finite length tape to travel along said draw-in path, said electric motor being controllable to maintain a constant preset moment applied to said tape by said changeable effective reel body radius of said reel body driven by said electric motor to apply a constant draw-in force to said draw-in mechanism.

2. The device of claim 1 further including at least one unit in the processing machine and wherein said electric motor usable to drive said reel body is mechanically independent of said at least one unit in the processing machine.

3. The device of claim 2 further including a drive mechanism for said at least one mechanically independent unit and wherein said electric motor and said drive mechanism are regulated in relation to each other.

4. The device of claim 1 wherein said electric motor is regulated as a function of measurement data determined in a draw-in process.

5. The device of claim 1 further wherein said tape second end is connectable to a web of material.

6. The device of claim 1 wherein said electric motor is an a.c. motor which is regulated by frequency conversion.

7. The device of claim 1 wherein said flexible draw-in mechanism is a steel tape.

8. A device for drawing a web of material into a processing machine comprising:

a flexible draw-in mechanism including a tape having a finite length, said tape having a tape first end and a tape second end, said draw-in mechanism being adapted to be driven for movement of said tape second end along a draw-in path;

a reel body, said tape first end being connected to said reel body, said tape having said finite length being windable completely on said reel body;

an effective reel body radius, said effective reel body radius being changeable as a function of an amount of said tape finite length wound on said reel body; and a controllable electric motor usable to drive said reel body independently of the processing machine to cause said finite length tape to travel along said draw-in path, said electric motor being controllable to maintain a preset torque applied to said tape.

* * * * *